March 28, 1939.  M. KLEIN ET AL  2,152,262
PRESSURE RESPONSIVE RHEOSTAT
Filed Sept. 3, 1935
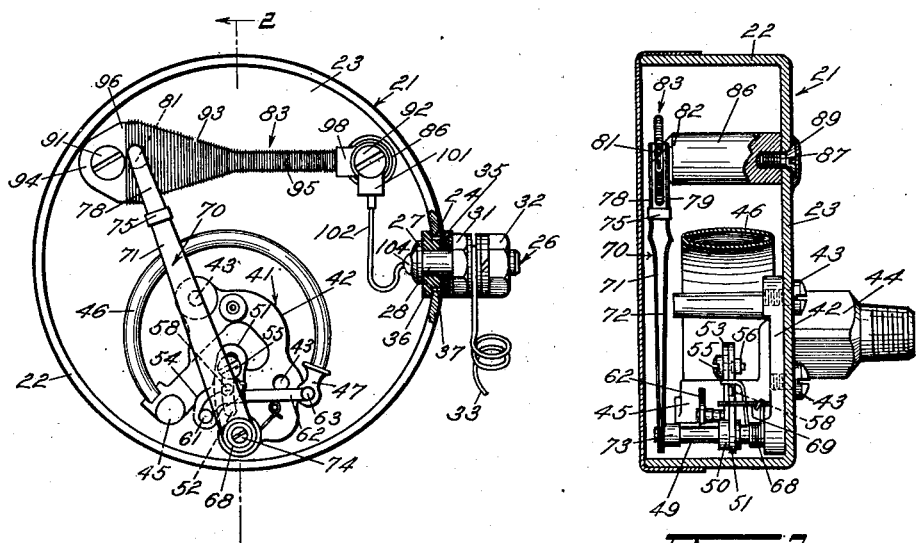
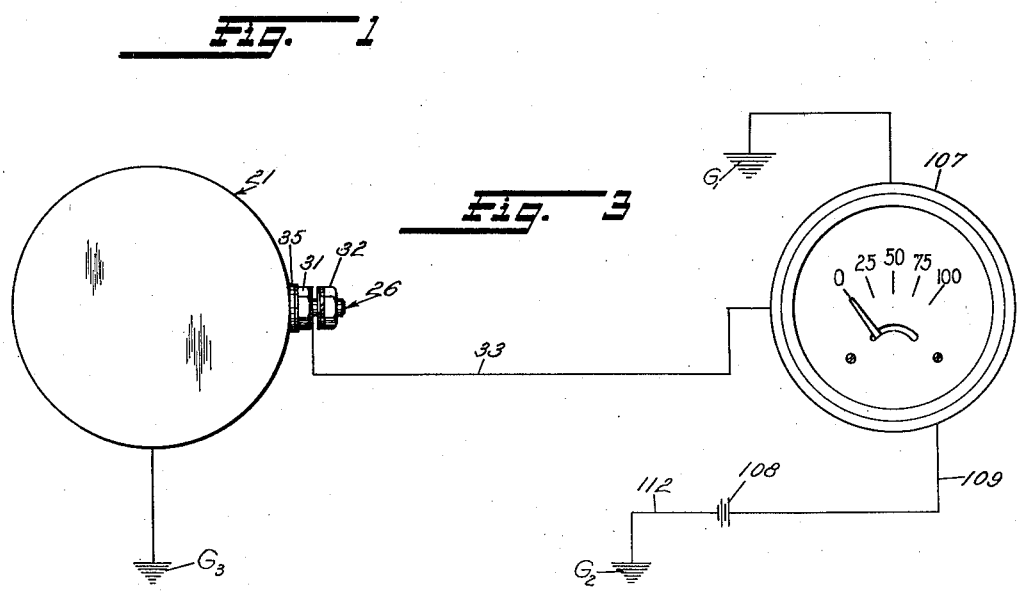
Inventor
Maximilian Klein
Bernhard Willach
By Strauch & Hoffman
Attorneys Patented Mar. 28, 1939

2,152,262

UNITED STATES PATENT OFFICE 2,152,262

PRESSURE RESPONSIVE RHEOSTAT

Maximilian Klein and Bernhard Willach, Sellersville, Pa., assignors to United States Gauge Company, Sellersville, Pa., a corporation of Pennsylvania Application September 3, 1935, Serial No. 39,062

6 Claims. (Cl. 201—69)

The present invention relates to improvements in pressure responsive rheostats, and, more particularly, concerns a pressure responsive rheostat designed for ready application at any point of a fluid system under pressure and for convenient inclusion in an electrical circuit including an indicator designed to show the pressure at said point.

It is frequently desirable to indicate electrically at a remote point of observation the pressure existing in a fluid system. This can readily be accomplished by employing a variable rheostat the effective resistance of which is automatically varied with the pressure in the system, such variation in resistance regulating the current flowing in an electrical circuit including an indicator showing the current flowing in said circuit. The indicator thus is actuated simultaneously with variations in the resistance which responds to pressure changes. The electrical indication of pressure at a remote point may be employed, for example, in an automotive vehicle, and is advantageous, when so used, inasmuch as the pressure measuring device may be located adjacent the source of pressure or at any desirable point in the oil or like system, and the indicator disposed on the dash, where it is readily visible, the indicator and pressure measuring device being connected only by electrical conductors. Such arrangement avoids the use of conduits extending to the dash ordinarily employed and required when a direct pressure measuring and indicating gauge is located on the dash of an automobile.

The primary object of the present invention resides in the provision of a combined rheostat and pressure measuring device of a unitary character capable of ready application and satisfactory use at any point of a fluid system subjected to varying pressures and for convenient insertion in an electrical circuit including an indicator of current flowing therein.

Another object of the present invention resides in the provision of a rheostat which is simple, compact and durable and capable of production at a low cost.

Still a further object of the present invention resides in the provision of a rheostat which is designed for actuation in proportion to changes in pressure of a fluid source, and which is designed to be electrically connected to an indicating instrument and to compensate for magnetic peculiarities of the indicating instrument.

Another object of the invention is to combine a pressure responsive device, and a rheostat controlled thereby, in a single casing that completely houses the assembly whereby the combined devices may be applied anywhere regardless of the conditions existing at the point of application thereof.

Further objects of the invention will appear in the following detailed description and appended claims when considered in conjunction with the drawing in which:

Figure 1 is a front elevational view of a preferred embodiment of the present invention with the casing cover removed.

Figure 2 is a sectional view taken substantially in line 2—2 of Figure 1, parts of the structure being shown in elevation to clarify the illustration.

Figure 3 is a diagrammatic view illustrating the preferred form of our invention when employed as part of a system for remote indication of pressure.

Referring now to Figures 1 and 2, the preferred form of our invention embodies a casing 21 having a cylindrical wall 22 and a transverse end wall 23. Mounted within an aperture 24 in cylindrical casing wall 22 is a conventional binding post assembly comprising a post 26 having a head 27 disposed within casing 21 and a shank 28 extending outwardly through aperture 24. Threaded on post shank 28 are nuts 31 and 32 which serve to firmly clamp one end of an electrical conductor 33 designed to be looped about shank 28 between the nuts and designed for connection with an external electrical circuit. An electrically insulating washer 35 is disposed concentrically about post 26 between nut 31 and the exterior surface of casing wall 22. Disposed concentrically upon post 26 between head 27 thereof and the interior surface of casing wall 22 is a second electrically insulating washer 36 provided with an axially offset portion 37 which extends within aperture 24 of the casing wall. The binding post 26 is thus completely insulated from casing 21 and current flowing through conductor 33 to shank 28 and head 27 will be prevented from flowing into casing 21.

A pressure responsive or measuring device, indicated generally at 41, is mounted upon transverse casing wall 23 adjacent cylindrical wall 22. This device includes a bracket or socket member 42 secured to casing wall 23 by screw 43 or the like and provided with a tubular extension 44 projecting outwardly from casing 21 through a suitable aperture (not shown) in wall 23. Bracket 42 is further provided with a post 45 extending into the interior of casing 21. Extension 44, bracket 42 and post 45 are provided with intercommunicating bores which through extension 44 are placed in communication with a fluid pressure source.

Mounted upon post 45 is one end of a Bourdon tube 46 the interior fluid chamber of which is in communication with the bore in post 45. The free end of Bourdon tube 46 is closed by a cap 47. Bourdon tube 46 is thus adapted for flexing, with consequent movement of the free end thereof, in response to pressure changes at the fluid pressure source in well known manner.

Mounted for rotation upon bracket 42 adjacent casing wall 22 is a sleeve 49 carried by a column (not shown) mounted on bracket 42. On sleeve 49 is rigidly secured a collar 50 carrying a curved crank arm 51 provided with an elongated slot 52. An extension arm 53 having an offset portion 54 is rigidly mounted upon crank arm 51 by means of a screw 55 locked in selective position with respect to slot 52 by means of a nut 56. A nipple 58 formed upon extension arm 53 is designed to extend into slot 52 to prevent rotation of arm 53 about bolt 55 and insure rigid interlocking of crank arm 51 and extension arm 53.

Offset portion 54 of arm 53 carries a pin 61 to which is pivoted one end of a link member 62, the other end of which is pivoted upon a pin 63 carried by Bourdon tube cap 47.

By means of the structure just described movement of the free end of Bourdon tube 46 is effective through link 62 to cause rotation of extension arm 53, crank arm 51, and sleeve 49 as a unit. The effective length of the torque arm formed by crank arm 51 and arm 53 may be varied by loosening screw 55, selectively positioning the screw with respect to slot 62 in crank arm 51 and retightening the screw. In this manner the normal distance from sleeve 49 to the line of force acting through link 62 may be selectively regulated and the magnitude of rotation of sleeve 49 in response to a given movement of the free end of Bourdon tube 46 may be controlled.

Coiled about sleeve 49 between bracket 42 and collar 50 is a helical spring 68, one end of which is secured about a pin 69 formed on bracket 42 and the other end of which bears against the torque arm formed by crank arm 51 and arm 53. Spring 68, which is relatively weak in comparison to the resilience of Bourdon tube 46, is provided for taking up backlash or lost motion in the joints between Bourdon tube tip 47 and crank arm 51.

A contactor arm 70 comprising dual axially spaced wiper arms 71 and 72 carried by a collar 73 are mounted upon the end of sleeve 49 remote from bracket 42. A screw 74 furnishes an end shoulder for sleeve 49 and holds the sleeve upon a column (not shown) mounted on bracket 42. Intermediate the ends of wiper arms 71 and 72 is provided a bridge member 75 which is secured to the wiper arms in any suitable manner as, for example, by welding or the like, and which is designed to retain the wiper arms in proper axially spaced relation and to prevent spreading of the extremities 78 and 79 of the wiper arms. The adjacent surfaces of wiper arm extremities 78 and 79 are provided with contact tips 81 and 82 respectively formed of electrically conductive material and designed to contact successive points on a resistor now to be described.

Disposed within casing 21 remote from sleeve 49 and substantially tangent to the path of travel of contactor tips 81 and 82 is a resistance, indicated generally at 83, which is supported upon insulating posts 86 or the like secured to casing wall 23 by means of screws 87 extending through the casing wall and threaded into the posts. The heads of screws 87, which are disposed outside casing wall 13, may be covered by solder 89 or other suitable material to prevent access to and adjustment of the screws after posts 86 have been assembled within casing 21. Resistance 83 is secured to insulating posts 86 by means of screws 91 and 92.

Resistance 83 comprises a multiplicity of convolutions or coils of relatively fine resistance wire 93 wound upon a non-conducting card 94 having one end 95 of uniform width, the remote end 96 of the card being of an increased and non-uniform width. The end of coil 93 adjacent the enlarged end 96 of the card is looped beneath the head of bolt 91 to prevent unwinding of the coil. The end turns of coil 93 adjacent uniform end 95 of the card are clamped beneath a clip 98 of conducting material which is bent concentrically about card 94 and which is designed to be clamped beneath the head of screw 92.

A second clip 101 of conducting material is clamped beneath the head of screw 92 and in contact with clip 98. Clip 101 is press-fitted securely on one end of a short electrical conductor 102 the remote end of which is secured in contact with binding post head 27 by means of solder 104 or the like.

As seen in Figure 2 the wiper arm contact tips 81 and 82 are designed to simultaneously contact the opposite sides of any particular turn of the resistance coil as the wiper arms 71 and 72 pass over the resistance coil during rotation of sleeve 49. Preferably, contact tips 81 and 82 are adapted for movement over the entire surface of the resistance coil, although if desired, movement of the tips 81 and 82 may be restricted to a localized portion of the resistance coil.

From the structure thus far described it will be appreciated that current flowing in conductor 33 will be confined within the rheostat unit to a circuit including binding post 26, conductor 102, resistance coil 93 and contact tips 81 and 82. Preferably electrical communication is provided between contact tips 81 and 82 and tubular extension 44, which is grounded, by a path including wiper arms 71 and 72, sleeve 49, bracket 42, and extension 44, which units are formed from electrically conductive material, although such communication may be effected in any other suitable manner.

Current flowing in conductor 33 from an external circuit may therefore pass through a continuous circuit within the rheostat including binding post 26, resistance 83, wiper arms 71 and 72, sleeve 49, bracket 42 and casing 21 to the grounded extension 44.

Figure 3 illustrates a preferred mode of using the combined pressure measuring device and rheostat unit of the present invention. The rheostat is connected in series with an external circuit including an electrical indicating instrument 107 responsive to changes in current flow, and a battery 108 which when used on an automobile is the battery of the car. Conductor 33, which is connected at one end to the binding post 26 of the rheostat unit, is at its other end connected to one terminal of the indicator 107. Within indicator 107 current passes through differential coils (not shown) one of which is grounded as indicated at $G_1$ to the vehicle frame and the other of which is connected by a wire 109 to the vehicle battery 108 which in turn is by means of a wire 112 grounded as indicated at $G_2$ to the vehicle frame. Casing 21 of the rheostat unit is by means of tubular extension 44 grounded as indicated at G₃ to the vehicle frame.

With battery 108 impressing a substantially constant electromotive force upon the circuit just described, and with a substantially constant resistance in the external part of the circuit, it will be appreciated that the current flowing in the circuit will be proportional to the effective resistance inserted into the circuit by resistor coil 93 of the rheostat unit.

The effective resistance of coil 93 depends, however, upon the position of contact tips 81 and 82 with respect to the resistance coil, the maximum effective resistance existing when the contact tips are furthest removed from end 95 of the coil.

Resistance coil 93 is enlarged at one end in order that current flow within the previously described circuit will increase more rapidly than the rate at which the contactor tips pass over the resistance coil during the period when the upper path of movement is reached. Such increase in the rate of current flow is necessary due to peculiarities in the magnetic coils of indicating instrument 107.

If desired the resistance existing between successive turns of the resistor coil may be varied by altering the shape of the coil for the purpose of compensating for errors in registration of the wiper arms with the resistance coil introduced by independent factors.

Operation of the rheostate unit will occur in the following manner: Variations in pressure existing at the fluid pressure source will be communicated through the bores in bracket 42 to the Bourdon tube which will be reactively distorted with consequent displacement of the free end of the Bourdon tube. Such movement of the free end of the tube is through link 62 effective to cause rotation of crank arm 51, sleeve 49 and wiper arms 71 and 72 as a unit. Contact points 81 and 82 are consequently reciprocated with respect to resistance coil 93 to vary the effective length thereof which in turn is effective to automatically regulate the current flow within the circuit including indicator 101 and battery 108. Indicator 107 will be actuated in response to such regulation of current flow and will thus register in response to variations in pressure source through the medium of the pressure responsive rheostat unit.

It will therefore be seen that the present invention provides a pressure responsive rheostat which responds accurately to variations in pressure at a fluid source, which automatically compensates for peculiarities in actuation of the indicating device, and which is compact and efficient in operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a pressure responsive rheostat; a casing including a cylindrical wall and a transverse end wall; a bracket mounted within said casing and with its back against said end wall; a pressure responsive element carried by said bracket and spaced considerably from one portion of said cylindrical wall, said element being uniformly responsive to equal increments of pressure variation; a contactor arm pivoted to said bracket and extending, in a plane in front of said responsive element, to a point considerably therebeyond and adjacent said portion of said cylindrical wall; a substantially flat and rectilinear resistance strip including non-uniform resistance areas supported on said end wall and spaced therefrom so as to lie in the aforementioned plane, said resistance strip extending chordally across said casing beyond the ends of the arc described by the free end of said contractor arm; said free end of said contractor arm being formed to contact opposite sides of said strip to thereby prevent movement of said free end away from said strip and consequent breaking of said contact; and means interconnecting said arm and said responsive element so that uniform movement of said responsive element causes said free end of said arm to uniformly move along said resistance strip, whereby the effective resistance of said rheostat is non-uniformly varied by equal variations of pressure in said responsive device.

2. In a pressure responsive rheostat, a casing including a cylindrical wall and an end wall; a bracket member in said casing; a pressure responsive element uniformly responsive to equal increments of pressure variation mounted on said bracket member and adapted to be connected to a source of fluid pressure; a pivot member rotatably mounted on said bracket; a resistance strip having non-uniform resistance areas supported in said casing, on said end wall, and between said responsive element and a portion of said cylindrical wall; spaced elongated contact elements extending from said pivot member and having free ends contacting opposite sides of said strip; means connecting said free ends at a point adjacent said strip to thereby prevent movement of said elongated contact elements away from said strip and consequent breaking of said contact; means connecting said pivot member and said responsive element so that said pivot is rotated uniformly by said element; whereby uniform variations in the fluid pressure at said source will cause said contact points to move uniformly along said strip and non-uniformly vary the effective resistance of said rheostat, and means to connect one end of said strip and said contact elements in an electric circuit.

3. In a pressure responsive rheostat, a casing including a cylindrical wall and a transverse end wall; a bracket mounted within said casing and with its back against said end wall; a pressure responsive element carried by said bracket and spaced considerably from one portion of said cylindrical wall; a contactor arm pivoted to said bracket and extending, in a plane in front of said responsive element, to a point considerably therebeyond and adjacent said portion of said cylindrical wall; a substantially flat and rectilinear resistance strip supported on said end wall; and spaced therefrom so as to lie in the aforementioned plane, said resistance strip extending chordally across said casing beyond the ends of the arc described by the free end of said contactor arm; said free end of said contactor arm being formed to contact opposite sides of said strip to thereby prevent movement of said free end away from said strip and consequent breaking of said contact; and means interconnecting said arm and said responsive element so that movement of said element causes said free end of said arm to move along said strip, whereby the effective resistance of said rheostat is varied by variations of pressure in said responsive element.

4. In a pressure responsive rheostat; a casing including a cylindrical wall and an end wall; a bracket member in said casing; a pressure responsive element mounted on said bracket and adapted to be connected to a source of fluid pressure; a pivot member rotatably mounted on said bracket; a resistance element supported in said casing, on said end wall, and between said responsive element and a portion of said cylindrical wall; spaced elongated contact elements extending from said pivot member and having free ends contacting opposite sides of said strip; means connecting said free ends at a point adjacent said strip to thereby prevent movement of said elongated contact elements away from said strip and consequent breaking of said contact; means connecting said pivot member and said responsive element so that said pivot is rotated by said responsive element, whereby variations in the fluid pressure will cause said contact points to move along said strip and vary the effective resistance of said rheostat; and means to connect one end of said strip and said contact elements in an electric circuit.

5. In a pressure responsive rheostat for use with an indicating instrument having non-uniform magnetic characteristics; a casing including a cylindrical wall and an end wall; a bracket mounted within said casing and with its back against said end wall; a pressure responsive element carried by said bracket and spaced considerably from one portion of said cylindrical wall, said element being uniformly responsive to equal increments of pressure variation; a contactor arm pivoted to said bracket and extending, in a plane in front of said responsive element, to a point considerably therebeyond and adjacent said portion of said cylindrical wall; spaced post members secured to said end wall and projecting into said casing; a substantially flat and rectilinear resistance strip, including non-uniform resistance areas, supported at its ends on said post members; said resistance strip extending chordally across said casing beyond the ends of the arc described by the free end of said contactor arm; said free end of said arm being formed to contact said strip; and means interconnecting said arm and said responsive element so that uniform movement of said responsive element causes said free end of said arm to uniformly move along said resistance strip, whereby the effective resistance of said rheostat is non-uniformly varied by equal variations of pressure in said responsive device.

6. In a pressure responsive rheostat, a casing including a cylindrical wall and a transverse end wall, a bracket member mounted within said casing, a pressure responsive element secured to said bracket and adapted to be connected to a source of fluid pressure, a pivot member rotatably mounted on said bracket adjacent said responsive element, a resistance strip including a non-uniform resistance area positioned within said casing, a contact element fixed to said pivot member and contacting said resistance strip, an arm on said pivot member, and means connecting said arm to said responsive element whereby variations in fluid pressure at said source will cause uniform rotation of said pivot and uniform movement of said contact along said resistance strip to vary the effective resistance of said rheostat, said connecting means being adjustable radially of said arm to adjust the amount of contact movement to be effected by a unit change in pressure.

MAXIMILIAN KLEIN.
BERNHARD WILLACH.